United States Patent
Marxer

(10) Patent No.: US 11,967,893 B2
(45) Date of Patent: Apr. 23, 2024

(54) INTERMEDIATE CIRCUIT DISCHARGE UNIT, ELECTRICAL DEVICE AND VEHICLE

(71) Applicant: JHEECO E-DRIVE AG, Eschen (LI)

(72) Inventor: Christian Marxer, Mauren (LI)

(73) Assignee: JHEECO E-DRIVE AG, Eschen (LI)

( * ) Notice: Subject to any disclaimer, the term of this patent is extended or adjusted under 35 U.S.C. 154(b) by 413 days.

(21) Appl. No.: 17/299,223

(22) PCT Filed: Dec. 18, 2019

(86) PCT No.: PCT/EP2019/085947
§ 371 (c)(1),
(2) Date: Jun. 2, 2021

(87) PCT Pub. No.: WO2020/127481
PCT Pub. Date: Jun. 25, 2020

(65) Prior Publication Data
US 2022/0037992 A1   Feb. 3, 2022

(30) Foreign Application Priority Data

Dec. 21, 2018  (DE) ..................... 10 2018 133 470.2

(51) Int. Cl.
*H02M 1/32* (2007.01)
*B60R 16/06* (2006.01)

(52) U.S. Cl.
CPC ............. *H02M 1/322* (2021.05); *B60R 16/06* (2013.01)

(58) Field of Classification Search
CPC ......... H02M 1/322; H02M 1/32; B60R 16/06; B60L 2210/40; B60L 2240/527; B60L 3/003

(Continued)

(56) References Cited

U.S. PATENT DOCUMENTS 5,998,973 A    12/1999 Tsai
9,018,865 B2*  4/2015 Meyer, III ............ H01M 10/44
                                                320/135

(Continued)

FOREIGN PATENT DOCUMENTS

CN    102666180 B  *  3/2016 .............. H02M 1/32
DE    102008010978 A1    8/2009

(Continued)

OTHER PUBLICATIONS

International Search Report of PCT/EP2019/085947 dated Apr. 7, 2020.

*Primary Examiner* — M Baye Diao
(74) *Attorney, Agent, or Firm* — Calfee, Halter & Griswold LLP

(57) ABSTRACT

The invention relates to an intermediate circuit discharge unit for an intermediate circuit discharge, in particular of a multi-level inverter, having a capacitor and a discharge circuit which is connected in parallel, where the discharge circuit has an active discharge branch with at least one first discharge element and a passive discharge branch with at least one second discharge element. The active discharge branch comprises a first control connection, and the passive discharge branch comprises a second control connection. The active discharge branch is coupled to the passive discharge branch via the first control connection in such a way that the active discharge branch can be controlled by the passive discharge branch, in particular a discharge via the active discharge branch can be activated or deactivated as required. The invention further relates to an electrical assembly, a vehicle, as well as a method.

18 Claims, 4 Drawing Sheets

(58) Field of Classification Search
USPC ......................................................... 320/166
See application file for complete search history.

(56) References Cited

U.S. PATENT DOCUMENTS

| | | | | |
|---|---|---|---|---|
| 2011/0057627 | A1* | 3/2011 | Kuehner ............... | B60L 3/0046 |
| | | | | 320/166 |
| 2013/0039107 | A1* | 2/2013 | Fukuta .................... | H02M 7/48 |
| | | | | 363/131 |
| 2015/0097426 | A1* | 4/2015 | Yamane .................. | B60L 15/02 |
| | | | | 307/10.1 |
| 2016/0105109 | A1* | 4/2016 | Jasim .................... | H02M 3/158 |
| | | | | 323/271 |
| 2017/0355267 | A1* | 12/2017 | Zhou ....................... | B60L 50/10 |

FOREIGN PATENT DOCUMENTS

| | | | | | |
|---|---|---|---|---|---|
| DE | 102008061585 | A1 | | 6/2010 | |
| DE | 102009055053 | A1 * | 6/2011 | ............. | H02M 1/32 |
| DE | 102012100951 | A1 * | 8/2013 | ............. | B60L 3/003 |
| DE | 102012100951 | A1 | | 8/2013 | |
| DE | 102008061585 | B4 * | 2/2019 | ............... | B60L 3/04 |
| WO | 2011085838 | A1 | | 7/2011 | |

* cited by examiner

US 11,967,893 B2

INTERMEDIATE CIRCUIT DISCHARGE UNIT, ELECTRICAL DEVICE AND VEHICLE

CROSS-REFERENCE TO RELATED APPLICATIONS

This application is a 371 of PCT Application No. PCT/EP2019/085947, filed on Dec. 18, 2019, which claims priority to German Application No. 10 2018 133 470.2 filed on Dec. 21, 2018, the contents of which are hereby incorporated by reference as if recited in their entirety.

The invention relates to an intermediate circuit discharge unit for intermediate circuit discharge, in particular of a multi-level inverter, having a capacitor and a discharge circuit connected in parallel. The invention further relates to an electrical assembly, as well as a vehicle and a method.

Electrical devices typically have an intermediate circuit with an intermediate circuit capacitor, inter alia, to smoothen out voltage peaks. From voltages above 60 V, the charges in the intermediate circuit must be dissipated in the event of a fault or when being switched off The intermediate circuit discharge is to take place within a certain time, in the automotive sector, for example, in less than 5 s. Accordingly, an active discharge circuit is required that short-circuits the intermediate circuit via a consumer (e.g. a resistor). Active presently means in particular that a switch or the like must be actuated for the short-circuit. One option is to provide a switchable discharge branch with a small resistor. During operation, the discharge branch is open so that no current flows.

For safety reasons, a passive discharge circuit must also be provided. The passive discharge circuit is typically implemented in its own discharge branch using high-ohmic resistors. The passive discharge branch is always in operation and generates power dissipation. Due to the high resistance, the discharge time of approx. 1-5 min however, is significantly longer than the discharge time of an active discharge circuit.

For example, publication DE 10 2008 022 776 A1 discloses a discharge circuit in which a permanently conductive passive discharge branch and an optionally short-circuitable active discharge branch are provided independently of one another. The active discharge branch is there short-circuited by decoupling from the battery contactors. The drawback is that rapid discharge cannot be activated during operation.

The object of the invention is to specify an intermediate circuit discharge unit that has a simple structure, provides an advantageous discharge function for an intermediate circuit of a two-level or multi-level converter, in particular in the event of a fault or in the event of a shutdown, and in the case of a multi-level converter enables a voltage balancing function to be provided. In addition, it is an object of the invention to specify an Electrical assembly and a vehicle.

This object is satisfied with regard to the intermediate circuit discharge unit by claim 1, with regard to the electrical assembly by claim 10, and with regard to the vehicle by claim 12. Preferred embodiments are specified in the dependent claims.

According to the present invention, an intermediate circuit discharge unit [sic: is provided] for discharging an intermediate circuit, in particular a multi-level inverter, having a capacitor and a discharge circuit which is connected in parallel, where the discharge circuit comprises an active discharge branch with at least one first discharge element and a passive discharge branch with at least one second discharge element. The active discharge branch comprises a first control connection and the passive discharge branch comprises a second control connection, where the active discharge branch is coupled to the passive discharge branch via the first control connection in such a way that the active discharge branch can be controlled by the passive discharge branch, in particular that a discharge via the active discharge branch can be activated or deactivated as required.

The invention is based on the basic idea that an active discharge circuit is combined with a passive discharge circuit in such a way that an advantageous discharge function can always be provided. The active discharge circuit or discharge function, respectively, can in particular be controllable by way of the passive discharge circuit or discharge function, respectively.

Furthermore, discharge circuits for multi-level inverters can be provided by way of the present invention, so that respective active and passive voltage balancing can be provided. Furthermore, the voltages can be selectively set for different voltage levels, in particular for and/or during a charging process.

Multi-level inverters are understood to be inverters or converters which have at least three different voltage levels and therefore can comprise two or more intermediate circuits. Each intermediate circuit has an absolute voltage potential and a relative voltage potential. Voltage balancing is the adaptation of the voltage potentials of several intermediate circuit voltages to one another, so that the relative intermediate circuit voltages can be the same or of different magnitude. A two-level inverter is understood to be an inverter or converter which has two voltage levels and therefore can only have one intermediate circuit. It is provided according to the present invention in particular that the active discharge branch can be controlled by the passive discharge branch. A discharge via the active discharge branch can then be activated or deactivated as required.

For this purpose, the passive discharge branch is electrically connected to the first control connection. Since a discharge takes place along the passive discharge branch, no voltage or electrical voltage can be present at the first control connection. Discharge via the active discharge branch can be activated or deactivated by way of applying a voltage to the first control connection as required using the passive discharge branch.

According to a preferred embodiment, the first discharge element and the second discharge element each comprise a resistor. The first and/or the second discharge element can comprise further resistors connected in parallel or in series. The first and/or the second discharge element can in particular be formed as precisely one resistor.

One respective consumer is therefore provided along the active discharge branch as well as along the passive discharge branch and is suitable for carrying out or providing an appropriate Intermediate circuit discharge. In particular, the active discharge branch and/or the passive discharge branch can be short-circuited via the first discharge element or the second discharge element, respectively, in order to provide an appropriate discharge of the intermediate circuit, in particular in the event of a fault or when an electrical assembly is switched off.

In one embodiment, the active discharge branch is configured as a series circuit composed of the first discharge element and a first switching element which comprises the first control connection.

A discharge can then take place along the first discharge element, preferably configured as a low-ohmic resistor, once the first switching element is switched through/switched to be conductive via the first control connection. An active discharge can be provided in the intermediate circuit discharge unit in particular by an automated switching process, i.e., without external intervention or control intervention.

According to one embodiment, a diode (freewheeling diode) is provided in parallel to the first switching element in the active discharge branch, in particular in the reverse direction. The first switching element can be configured in particular as an IGBT (integrated bipolar transistor), in particular with an integrated freewheeling diode. The arrangement of the diode in the reverse direction means that a current flow in the direction commonly intended for the intermediate circuit discharge cannot flow via the diode, but exclusively via the switchable first switching element of the active discharge branch. On the other hand, a current flow in the opposite direction, i.e., past the separately connected first switching element, via the diode connected in parallel and the first discharge element, preferably in the form of a resistor as a consumer, is possible at any time.

In a further embodiment, the passive discharge branch comprises at least one first sub-branch and one second sub-branch. The first sub-branch in particular is formed in connection with the control connection of the active discharge branch and the second sub-branch is formed as a sub-discharge branch.

The passive discharge branch is then divided into sub-branches connected in parallel in order to be able to provide a discharge via the passive discharge branch as well as controllability of the active discharge branch via the first control connection.

In particular, the discharge can be activated along the active discharge branch without external control intervention, in particular by way of the passive discharge branch. For initiating the active discharge or activating the active discharge branch, the first control connection can expediently have a voltage or a current applied to it.

The passive discharge branch can comprise further sub-branches connected in parallel, in particular a third and/or a fourth sub-branch.

According to one embodiment, the active discharge branch and the passive discharge branch are configured and connected to one another in such a way that when a discharge along the at least one second sub-branch is blocked—in the case of a third, fourth or further sub-branch when all sub-branches except the first sub-branch are blocked—a discharge via the active discharge branch can be triggered, in particular can always be triggered, by way of the first sub-branch.

Since a passive discharge is carried out only along the first sub-branch, a voltage or current flow can be effected at the first control connection of the active discharge branch. The active discharge branch can be switched by way of the passive discharge branch via the first control connection for enabling an active discharge.

It is preferably provided that, when a passive discharge is initiated along the passive discharge circuit along a second and/or third and/or fourth etc. sub-branch, an active discharge is set or deactivated via the active discharge circuit. For the reason that the passive discharge branch provides the control voltage for the control connection of the first switching element of the active discharge branch, an active discharge can be ensured even without the presence of an external control voltage, for example, in the event of loss of the control voltage of a control device.

In a further embodiment, the first sub-branch comprises a voltage limiting valve, in particular a Zener diode, where the voltage limiting valve has a breakdown voltage (reverse voltage) for triggering an active discharge along the active discharge branch, in particular at a breakdown voltage of up to 15 V.

The control voltage of the first control connection or switching element, respectively, is there equal to or lower than the breakdown voltage of the voltage limiting valve.

Furthermore, a discharge along the passive discharge branch along the second discharge element is ensured regardless of the switching state of a second, third, fourth, etc. sub-branch at the latest from the presence of said breakdown voltage. In other words: Discharge via the passive discharge branch takes place continuously when a sub-branch is switched to be conductive and/or the necessary breakdown voltage of the current limiting valve has been reached.

In a particularly advantageous embodiment, the first sub-branch comprises two or more voltage limiting valves connected in parallel, in particular Zener diodes. This can increase the reliability against failure.

A current flow along the first sub-branch of the passive discharge branch can then be blocked until the predeterminable breakdown voltage of the voltage limiting valve has been reached.

In order to enable the switching via the first control connection of the active discharge branch, the necessary control voltage of the first control connection for switching the first switching element to be conductive is lower than the breakdown voltage of the voltage limiting valve or valves.

Within the meaning of the present invention, the passive discharge branch can therefore always be employed for discharging, in particular in that the voltage limiting valve provides a control voltage required for the first control connection without a switching process or the like needing to be actively performed.

In addition, the passive discharge branch can comprise further switchable discharge branches (sub-branches) in addition to the first sub-branch. Within the meaning of the present invention, the passive discharge branch can provide both a discharge along the second discharge element only along the first sub-branch—where discharge along the first discharge element is activated—as well as also comprise actively switchable switching elements in further sub-branches for discharging along the second discharge element, where discharge along the first discharge element is deactivated.

In contrast, for active discharge via the preferably low-ohmic first discharge element, switching of the active discharge branch by way of the first control connection is in any case necessary in order to enable an active discharge. Accordingly, the active discharge branch is disconnected during operation and is only switched through for active discharge as required.

According to a further preferred embodiment, the second sub-branch comprises at least one second controllable switching element for controlling a discharge along the second sub-branch of the passive discharge branch.

It is then possible to regulate a discharge via the passive discharge branch by way of a second controllable switching element in the second sub-branch or to switch it on or off, respectively.

An active discharge is preferably terminated once a discharge via a second and/or third and/or fourth sub-branch of the passive discharge branch is enabled, in particular by actuating the second controllable switching element in the second sub-branch.

According to a preferred embodiment, all switching elements of the active discharge branch and of the passive discharge branch are configured in the form of transistors.

The switching element of the active discharge branch is particularly preferably configured as an IGBT (insulated gate bipolar transistor).

A switchable active discharge can thus be provided in dependence one of at least two possible discharge paths of the passive discharge branch. The first transistor-shaped switching element can be actuated with the first control connection via the passive discharge branch. In contrast, the at least one second transistor-shaped switching element can be switched with the second control connection by way of an external control signal, so that a discharge via a sub-branch of the passive discharge branch can be made available as required in a switchable manner. Once a discharge takes place via a sub-branch of the passive discharge branch, the active discharge can be interrupted or terminated by a switching process of the transistor-shaped first switching element.

In one embodiment, the intermediate circuit discharge unit comprises at least one control device which is connected to the at least one second control connection of the passive discharge branch for controlling a discharge along the at least one second sub-branch.

A discharge along the passive discharge branch can be provided by way of the control device via the second control connection of the at least one second switching element in the at least one further second sub-branch. If the second switching element is switched through, a discharge takes place along the second sub-branch and the second discharge element of the passive discharge branch.

In particular when the second switching element is switched through, an electrical current from the first sub-branch is dissipated in the second sub-branch and thus from the first control connection of the first switching element. The first switching element of the active discharge branch is therefore switched separately once a previously applied current or a previously applied voltage, respectively, is dissipated along the second sub-branch by switching the second switching element through.

A plurality of further sub-branches, each with a further switching element, can be provided in a preferable manner in the passive discharge branch and can be switched separately from one another by way of the control device.

An electrical assembly is provided in an independent claim aspect of the invention, in particular for a vehicle, with at least one intermediate circuit discharge unit according to the invention, where a plurality of intermediate circuit discharge units is arranged as a series circuit.

It is provided according to a preferred embodiment that the electrical assembly is a drive converter for a traction motor of a vehicle with at least three voltage levels, where the intermediate circuit discharge units can be actuated in such a way that the individual voltage levels of the drive converter are adjustable, in particular for and/or during a charging and/or driving operation.

In this way, for example, voltage levels from or voltage distribution among intermediate circuit capacitors can be set in a selective manner before being or when connected to a charge source in order to generate a desired voltage symmetry or voltage asymmetry. Furthermore, the voltage levels of the intermediate circuit capacitors can be set selectively symmetrically or asymmetrically before and/or during the charging process, in particular in dependence of the state of charge of a battery and in dependence of the charge voltage of a charging source.

In combination with charge inductances, the drive converter can advantageously be configured as a step-up converter for adapting a voltage level of a charge source to a voltage level of a battery connected to the drive converter.

It is thus advantageously possible to set different voltage levels in a selective manner as required by way of the electrical assembly with the intermediate circuit discharge unit according to the invention.

In a further independent aspect of the invention, a vehicle with at least one intermediate circuit discharge unit according to the invention and/or at least one electrical assembly according to the present invention is provided.

A method for intermediate circuit discharge is also claimed from a further perspective. A discharge circuit formed to be switchable is provided and comprises a discharge resistor and a switching element with a control connection. A control circuit is furthermore provided, where the control circuit is configured as a voltage divider with two dipoles connected in series. Each dipole can comprise electrical assemblies, preferably a resistor and a Zener diode. The point of connection of the two dipoles (the center point of the voltage divider) is connected to the control connection of the switching element of the discharge circuit. A dipole can be bridged by use of a further switching element (bridge switch) of the control circuit, so that without bridging one of the two dipoles, the discharge circuit is short-circuited (conductive) and when one of the two dipoles is bridged, the discharge circuit is opened (non-conductive). The bridge switch comprises a control connection. To discharge the intermediate circuit, the discharge circuit is short-circuited by way of the control connection of the bridge switch.

In a preferred embodiment, a bridge of a dipole is switched on by default when the electrical assembly is started up. A bridge of a dipole is automatically switched off when a supply voltage is lost. A bridge of a dipole is optionally and temporarily switched off if a voltage of the intermediate circuit is outside a specified target range.

The discharge circuit is used for fast discharge of an intermediate capacitor and is configured for a power loss of preferably 30-90W, in particular 45 W. The control circuit is used to open and close the discharge circuit. The discharge circuit is closed when a control voltage is applied to the control connection of the switching element of the discharge circuit. A control voltage is normally always applied to the control connection by the discharge circuit configured as a voltage divider. It is preferably sufficiently high for the switching element to be switched to be conductive. The control voltage at the control connection can be changed by bridging a dipole of the voltage divider. This is done with at least one further switching element. As a result, a control voltage can be lowered to below the voltage required for switching the switching element of the discharge circuit to be conductive.

The target range is to be understood to be, in particular, a voltage range of an intermediate circuit that is above a maximum permissible voltage, for example, of an intermediate circuit capacitor (overvoltage protection). Furthermore, the target range is to be understood to be a safe voltage level (for humans) of in particular <60V which is predefined, for example, when the electrical assembly is switched off or when a housing of the electrical assembly is opened. Furthermore, the target range is to be understood to be a voltage range that is advantageously selected in dependence of a voltage of a charging source for charging a battery that is connected or connectable to the electrical assembly.

In the case of several bridge switches, an additional switch can be provided which overrides two or more bridge switches, in particular in that it separates the control connections of the bridge switches from a control voltage or a control signal, respectively. This means that a discharge can be forced even if the signal from a bridge switch is faulty.

The control circuit is preferably also configured as a second discharge circuit for passive discharge. Passive discharge means an electrically conductive connection between two busbars of different potential with only low power consumption, in particular with currents in the range of <10 mA.

The passive discharge is preferably configured such that it cannot be switched off. This means that an electrical connection or a current flow, respectively, via the second discharge circuit cannot be interrupted. A dipole is understood to be an electrical conductor with two connections. For example, a resistor, a Zener diode or also a series connection of resistors can be understood to be a dipole.

A control voltage is to be understood to be a voltage for controlling currents and/or voltage, in particular for controlling control connections of electrical switches, e.g. 12V. The control voltage is preferably galvanically separated from a main voltage which is higher than the control voltage, e.g. 800V.

In the following, the invention shall be explained in more detail using several embodiments with reference to the appended drawings.

Schematically Shown in

Figure 1:
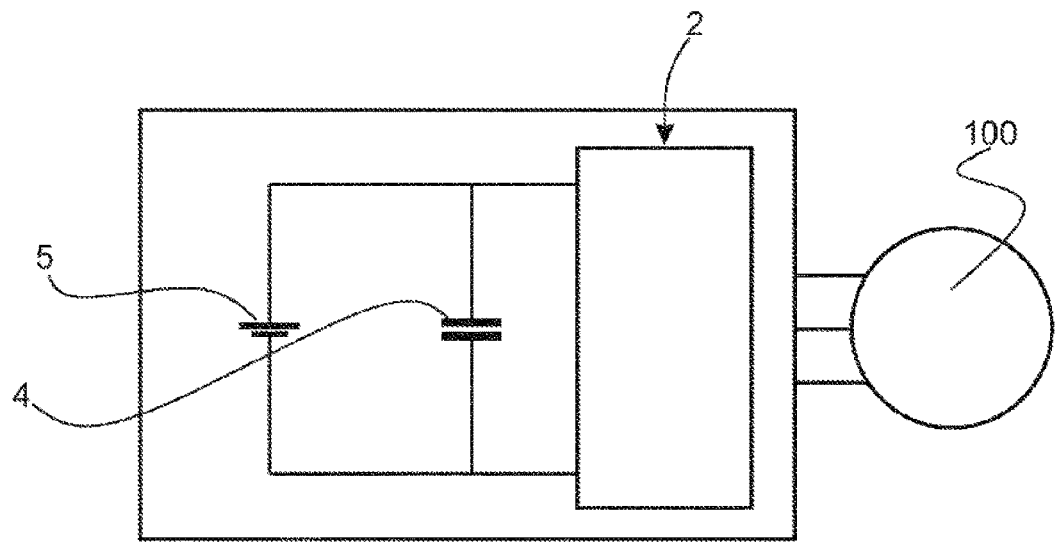
FIG. 1 is an intermediate circuit with an intermediate circuit capacitor according to prior art.

FIG. 1 shows an intermediate circuit with an intermediate circuit capacitor 4 according to prior art. In particular, an electric motor 100 is connected to an inverter 2. Inverter 2 is connected in parallel to an intermediate circuit capacitor 4. A battery or a power supply unit 5, respectively, is in turn provided at the terminals, and therefore parallel to the capacitor. Voltage peaks in particular can then be smoothed using intermediate circuit capacitor 4.

Figure 2:
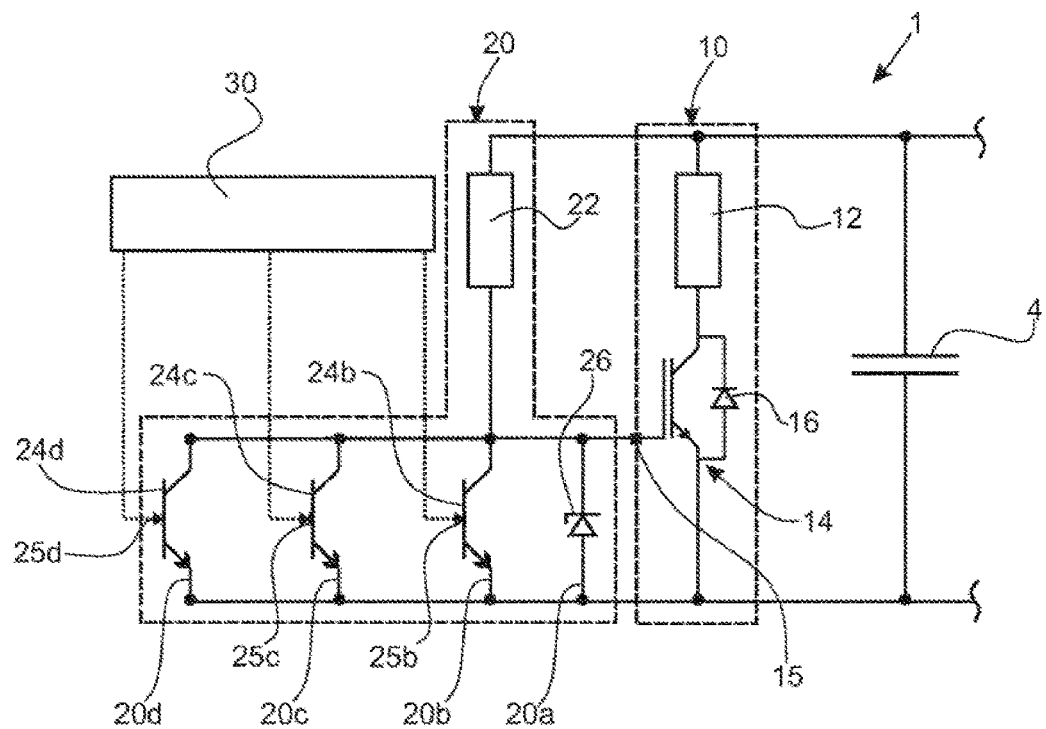
FIG. 2 is a first embodiment of an intermediate circuit discharge unit according to the invention.

FIG. 2 illustrates a first embodiment of an intermediate circuit discharge unit 1. In particular, intermediate circuit discharge unit 1 is provided connected in parallel to intermediate circuit capacitor 4. The circuit comprises a first and a second busbar with two voltage potentials.

The intermediate circuit discharge unit comprises an active discharge branch 10, a passive discharge branch 20, and a control device 30. Passive discharge branch 20 and active discharge branch 10 are connected in parallel. Active discharge branch 10 can also be addressed as a discharge circuit. The passive discharge branch can also be addressed as a control circuit.

Active discharge branch 10 comprises a series connection of a first discharge element or discharge resistor 12, respectively, as a consumer, and a first switching element 14. A diode 16 is in turn arranged connected in parallel to first switching element 14.

First discharge resistor 12 is preferably provided as a low-ohmic discharge resistor. This enables a high level of electrical energy consumption.

According to FIG. 2, diode 16 is arranged in a blocking manner parallel to first switching element 14 and in the typical direction of current flow for the intermediate circuit discharge, i.e., a direction of current from top to bottom. Current can then flow according to FIG. 2 from bottom to top through diode 16 in the passage direction and thereby bypass first switching element 14. In the reverse direction of diode 16, i.e. from top to bottom, however, a current must necessarily pass through first switching element 14.

First switching element 14 also comprises a first control connection 15 which is electrically connected to passive discharge branch 20. A switching operation of first switching element 14 for switching through first switching element 14 as required and thereby for active discharge can therefore take place by way of passive discharge branch 20. During operation of an electrical device connected to the discharge circuit, active discharge branch 10 is preferably deactivated, i.e., separated or non-conductive, where an active discharge can be activatable in particular during a fault event or shutdown.

Furthermore, passive discharge branch 20 according to FIG. 2 comprises a second discharge resistor 22 as well as a first, second, third, and fourth sub-branch 20a; 20b; 20c; 20d. Sub-branches 20a; 20b; 20c; 20d are connected in series to second discharge resistor 22 and interconnected or connected in parallel among each other or to one another, respectively.

The second discharge element or discharge resistor 22, respectively, is preferably configured as a high-ohmic discharge resistor 22. The power conversion of electrical energy through discharge resistor 22 is then limited. Discharge resistor 22 can be understood to be a first dipole.

First sub-branch 20a comprises a voltage limiting valve 26, in particular in the form of a Zener diode with a preferred reverse or breakdown voltage of 15V. There is an electrical connection to first control connection 15 of first switching element 14 of active discharge branch 10 between voltage limiting valve 26 and second discharge resistor 22. Zener diode 26 can be understood to be a second dipole. The first and the second dipole are connected in series and consequently comprise a point of connection. The first and the second dipole form a voltage divider.

First sub-branch 20a of the passive discharge branch can therefore be considered to be permanently switched to be conductive above the predeterminable breakdown voltage, preferably of 15V. Up to the predeterminable breakdown voltage, however, first sub-branch 20a is to be regarded as switched to be permanently blocked.

Second, third, and fourth sub-branches 20b; 20c; 20d are each formed with a second, third, and fourth switching element 24b; 24c; 24d. Switching elements 24b; 24c; 24d along second, third, and fourth sub-branches 20b; 20c; 20d also each comprise a second, third, and fourth control connection 25b; 25c; 25d. Second, third, and fourth sub-branches 20b; 20c; 20d according to FIG. 2 are therefore identical and formed to be switched in parallel to one another.

Furthermore, control connections 25b; 25c; 25d of second, third, and fourth switching element 24b; 24c; 24d are connected to control device 30, so that switching elements 24b; 24c; 24d can be switched by way of an external control signal. Second, third and fourth switching elements 24b; 24c; 24d are typically switched separately. A through-connection of second, third, and/or fourth switching element 24b; 24c; 24d for providing a selective discharge along second, third, and/or fourth sub-branch 20b; 20c; 20d is established by way of control device 30. The individual sub-branches can then each be formed for different purposes and respond to different triggering factors. This includes, for example, an overtemperature shutdown in order to avoid overheating of discharge resistor 12. Furthermore, individual sub-branches can be provided for various fault events, when used in a vehicle, in particular in a vehicle crash. The sub-branches can be configured advantageously for the respective purpose and in particular comprise further electrical components.

Figure 3:
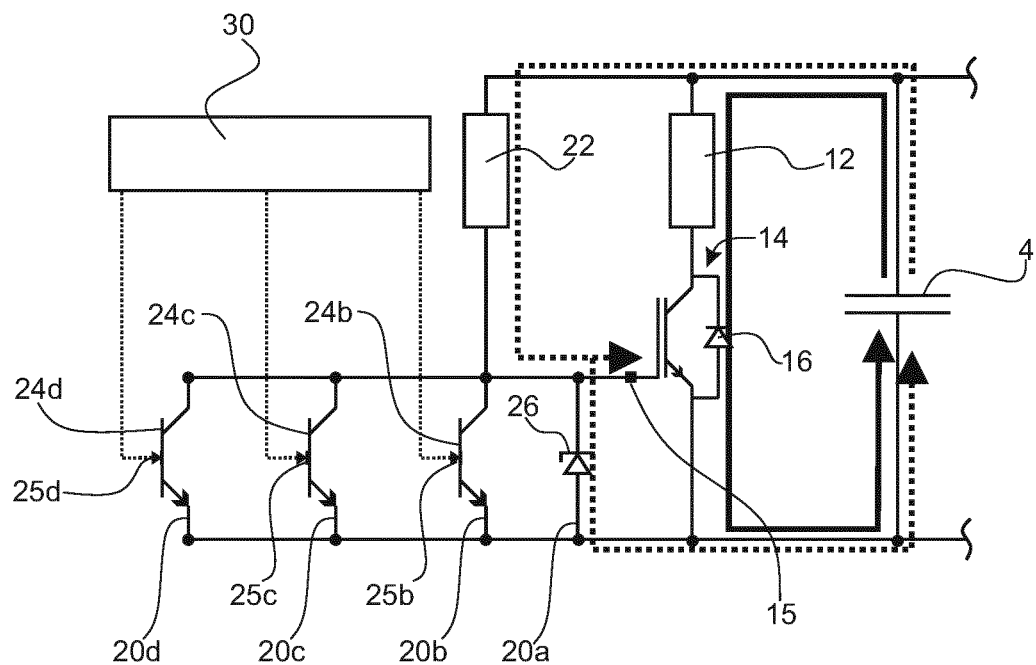
FIG. 3 is the intermediate circuit discharge unit according to FIG. 2, in particular during an active discharge.

FIG. 3 shows the intermediate circuit discharge unit according to FIG. 2, in particular during an active discharge;

When a current flow takes place through second discharge resistor 22 and sub-branch 20a with voltage limiting valve 26 configured as a Zener diode, a voltage is applied to first control connection 15 of first switching element 14 that is sufficiently high to switch the switching element (cf. dashed arrow illustration in the arrow direction in FIG. 3). In this sense, first switching element 14 can be switched through in order to provide an active discharge (see solid arrow direction in FIG. 3).

Furthermore, above the predeterminable breakdown voltage, a discharge can be carried out simultaneously via first sub-branch 20a and second discharge resistor 22 of passive discharge branch 20 (cf. dashed arrow direction in FIG. 3).

Figure 4:
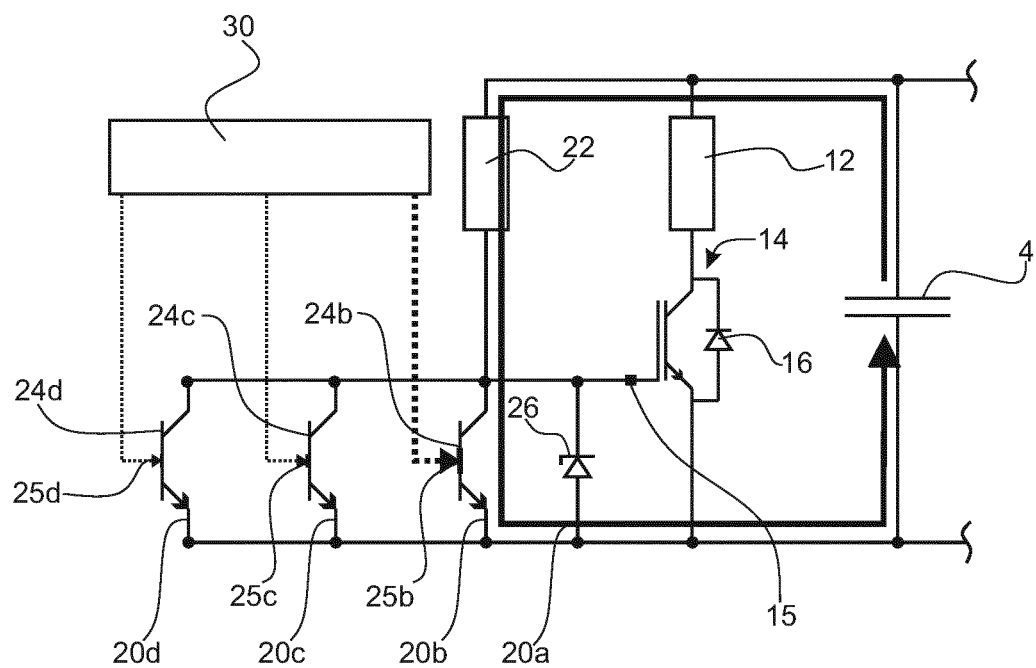
FIG. 4 is the intermediate circuit discharge unit according to FIG. 2 during a discharge along the passive discharge branch.

FIG. 4 shows the intermediate circuit discharge unit according to FIG. 2 during a discharge along passive discharge branch 20 or sub-branch 20b, respectively.

If one of switching elements 24b; 24c; 24d of passive discharge branch 20 is switched through by way of control unit 30 (see dashed arrow illustration in FIG. 4) or if the voltage applied reaches the breakdown voltage of voltage limiting valve 26 along first sub-branch 20a (see dashed arrow illustration in FIG. 3), a discharge is enabled via passive discharge branch 20 (cf. solid arrow representation in FIG. 4).

In particular in the course of switching through one of switching elements 24b; 24c; 24d of passive discharge branch 20, a discharge via active discharge branch 20 is terminated or interrupted, respectively, in that the control voltage at control connection 15 drops below the control voltage required for switching to a conductive state, so that first switching element 14 is again switched separately.

An active discharge can therefore be provided by way of passive discharge branch 20 via active discharge branch 10 as required, as well as a discharge via passive discharge branch 20. Switching elements 24b; 24c; 24d of second, third, and fourth sub-branch 20b; 20c; 20d can preferably be switched individually or in combination by way of control device 30 in order to provide a suitable intermediate circuit discharge.

Figure 5:
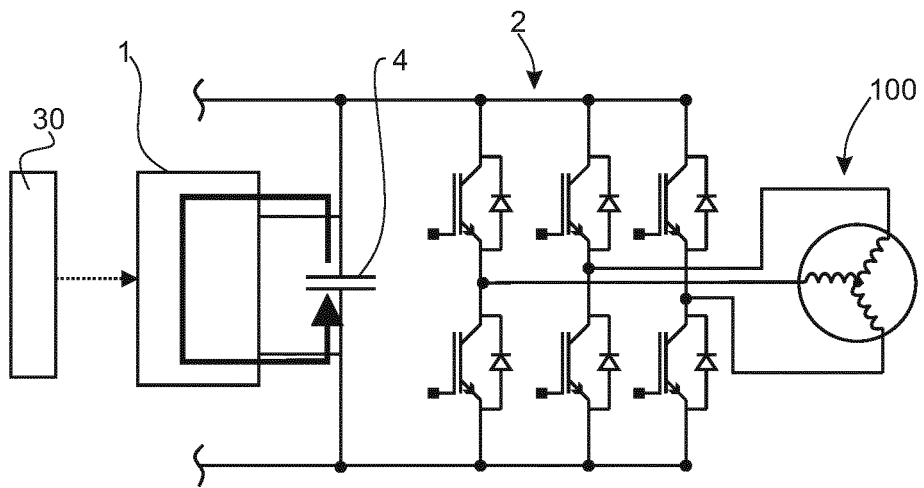
FIG. 5 is a first embodiment of a multi-level inverter in combination with an intermediate circuit discharge unit according to the invention.

FIG. 5 shows a first embodiment of a two-level inverter in combination or in parallel connection, respectively, with an intermediate circuit capacitor 4 and with an intermediate circuit discharge unit 1 according to the invention. In particular, a two-level inverter 2 is shown in connection with electric motor 100.

Intermediate circuit discharge unit 1 connected in parallel to two-level inverter 2 comprises, inter alia, control device 30 in a suitable connection to preferably passive discharge branch 20.

According to the arrow representation shown in FIG. 5, a discharge of intermediate circuit capacitor 4 can be effected in an expedient manner via intermediate circuit discharge unit 1.

Figure 6:
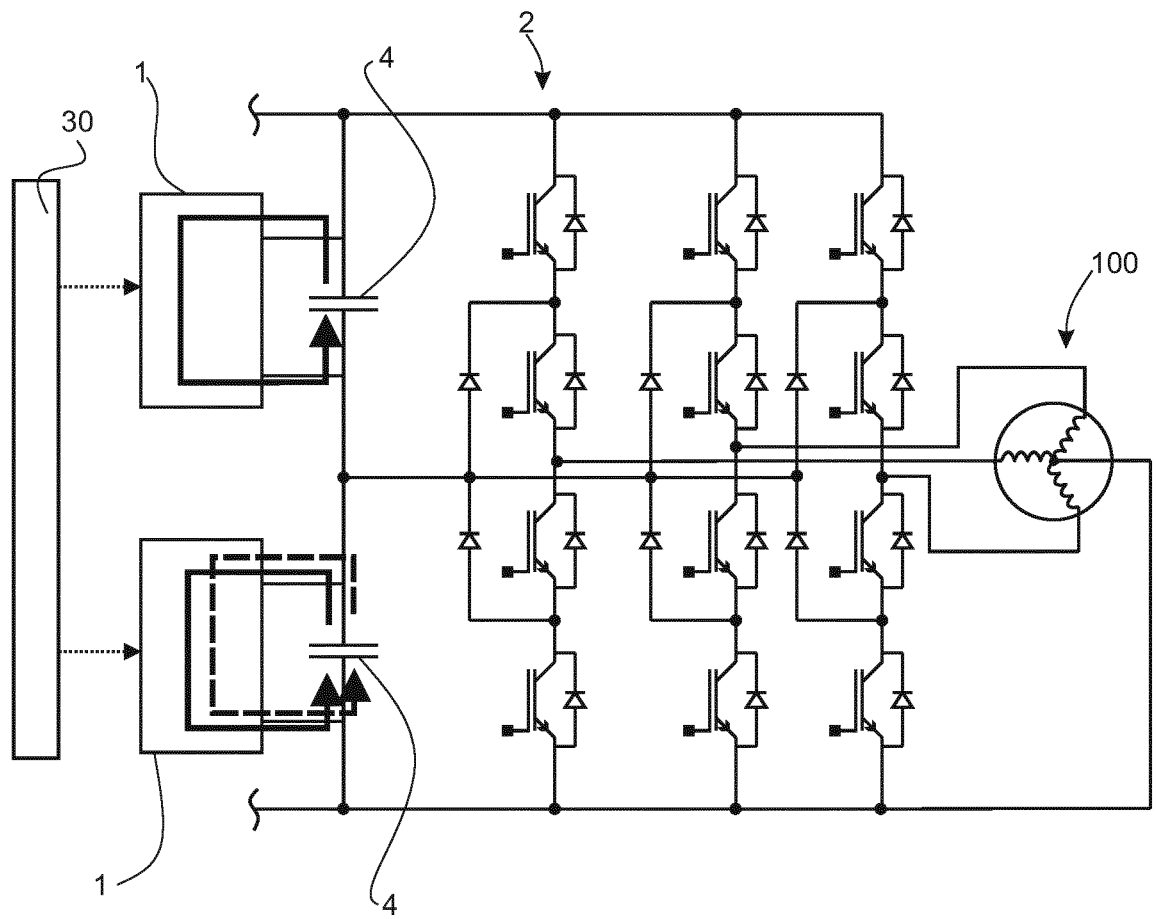
FIG. 6 is a second embodiment of a multi-level inverter in combination with two intermediate circuit discharge units according to the invention connected in series.

FIG. 6 illustrates a second embodiment of a multi-level inverter, in particular a three-level inverter 2, in combination with two intermediate circuit discharge units 1 according to the invention connected in seriesIn particular, two parallel circuits are provided, each composed of an intermediate circuit discharge unit 1 and an intermediate circuit capacitor 4, which are connected to one another in series.

If an intermediate circuit discharge is to be carried out by way of intermediate circuit discharge units 1, then current or voltage dissipation is effected along the solid arrow directions according to FIG. 6 via two intermediate circuit discharge units 1.

For the case of performing intermediate circuit balancing, a current or voltage transfer can take place according to the dashed arrow direction in FIG. 6 from an intermediate circuit capacitor 4 via the associated intermediate circuit discharge unit. As a result, the voltage at the center of the intermediate circuit between two intermediate circuit capacitors 4 can be reduced. Analogously, the voltage at the center of the intermediate circuit between two intermediate circuit capacitors 4 can be increased by actuating the other intermediate circuit discharge unit.

Figure 7:
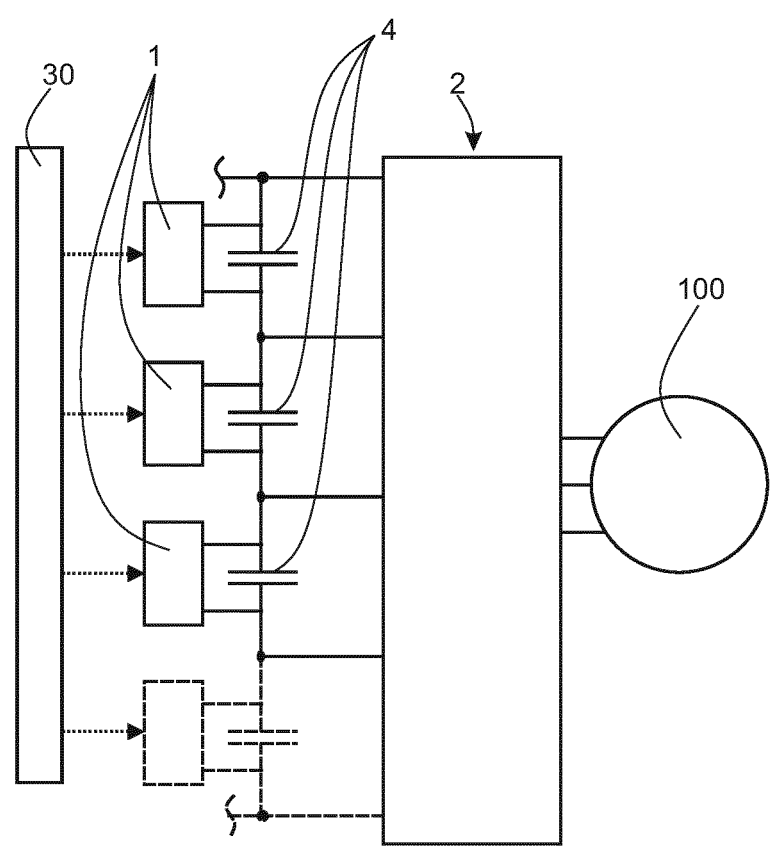
FIG. 7 is a third embodiment of a multi-level inverter in combination with four intermediate circuit discharge units according to the invention connected in series.

FIG. 7 illustrates a third embodiment of a multi-level inverter 2, in particular a five-level inverter 2, in combination with four intermediate circuit discharge units 1 according to the invention connected in series. Intermediate circuit discharge units 1 are each arranged connected in parallel to an intermediate circuit capacitor 4.

It is therefore clear that any number of voltage levels of multi-level inverters can be managed or provided by using an adequate number of intermediate circuit discharge units 1. Both an appropriate intermediate circuit discharge as well as intermediate circuit or voltage level balancing can be provided.

For example, a three-level inverter with a supply voltage of 800V has two intermediate circuit voltages. In the case of symmetrical voltage distribution, both intermediate circuits have a relative voltage potential of 400V each. In the case of asymmetrical voltage distribution, a first intermediate circuit can have, for example, 500V and a second intermediate circuit 300V.

In summary, automatic active discharge as well as passive discharge can be provided via a passive discharge branch in a coupled form with the aid of intermediate circuit discharge unit 1 according to the invention.

In addition, multi-level inverters can also be operated in a suitable manner with a suitable number of intermediate circuit discharge units, where both the intermediate circuit discharge as well as voltage level or intermediate circuit balancing is made possible.

REFERENCE NUMERALS 1 intermediate circuit discharge unit
2 inverter/multi-level inverter
3 intermediate circuit capacitor
5 voltage source/battery
10 active discharge branch
12 first discharge element/resistor
14 first switching element
15 first control connection
16 diode
20 passive discharge branch 20a first sub-branch
20b second sub-branch
20c third sub-branch
20d fourth sub-branch
22 second discharge element/resistor
24b second switching element
24c third switching element
24c fourth switching element
25b second control connection
25c third control connection
25d fourth control connection
26 voltage limitation valve/Zener diode
30 control device
100 motor unit

The invention claimed is:

1. Electrical assembly comprising at least one intermediate circuit discharge unit for intermediate circuit discharge of a multi-level inverter, having a capacitor and a discharge circuit connected in parallel,
where said discharge circuit comprises an active discharge branch with at least one first discharge element and a passive discharge branch with at least one second discharge element,
where said active discharge branch comprises a first control connection and said passive discharge branch comprises a second control connection,
where said active discharge branch is coupled to said passive discharge branch via said first control connection in such a way that said active discharge branch can be controlled by said passive discharge branch,
wherein said electrical assembly comprises a plurality of intermediate circuit discharge units which are arranged as a series circuit,
wherein said electrical assembly is a drive converter for a traction motor of a vehicle with at least three voltage levels, where said intermediate circuit discharge units can be actuated in such a way that the individual voltage levels of said drive converter are adjustable, and
wherein said passive discharge branch comprises at least a first sub-branch and a second sub-branch, where said first sub-branch is formed in connection with said control connection of said active discharge branch and said second sub-branch is formed as a sub-discharge branch.

2. Electrical assembly according to claim 1, wherein said first discharge element and said second discharge element each comprise a resistor.

3. Electrical assembly according to claim 1, wherein said active discharge branch is configured as a series connection composed of said first discharge element and a first switching element which comprises said first control connection.

4. Electrical assembly according to claim 1,
wherein
said active discharge branch and said passive discharge branch are configured and connected to one another in such a way that, when a discharge along said at least one second sub-branch is blocked, a discharge via said active discharge branch can be triggered by way of said first sub-branch.

5. Electrical assembly according to claim 1,
wherein
said first sub-branch comprises a voltage limiting valve, in particular a Zener diode,
where said voltage limiting valve has a breakdown voltage for triggering an active discharge along said active discharge branch, in particular at a breakdown voltage of up to 15 V.

6. Electrical assembly according to claim 1,
wherein
said second sub-branch comprises at least one second controllable switching element for controlling a discharge along said second sub-branch of said passive discharge branch.

7. Electrical assembly according to claim 1,
wherein
all switching elements of said active discharge branch and of said passive discharge branch are configured in the form of transistors.

8. Electrical assembly according to claim 1,
wherein
said intermediate circuit discharge unit comprises at least one control device which is connected to said at least one second control connection of said passive discharge branch for controlling a discharge along said at least one second sub-branch.

9. Electrical assembly according to claim 1, where the discharge via said active discharge branch can be activated or deactivated as required.

10. Electrical assembly according to claim 1,
wherein
the individual voltage levels of said drive converter are adjustable before and/or during a charging and/or driving operation.

11. Vehicle with at least one electrical assembly according to claim 1.

12. Electrical assembly according to claim 2, wherein said active discharge branch is configured as a series connection composed of said first discharge element and a first switching element which comprises said first control connection.

13. Electrical assembly according to claim 12, wherein said active discharge branch and said passive discharge branch are configured and connected to one another in such a way that, when a discharge along said at least one second sub-branch is blocked, a discharge via said active discharge branch can be triggered by way of said first sub-branch.

14. Electrical assembly according to claim 13, wherein said first sub-branch comprises a voltage limiting valve, in particular a Zener diode,
where said voltage limiting valve has a breakdown voltage for triggering an active discharge along said active discharge branch, in particular at a breakdown voltage of up to 15 V.

15. Electrical assembly according to claim 14, wherein said second sub-branch comprises at least one second controllable switching element for controlling a discharge along said second sub-branch of said passive discharge branch.

16. Electrical assembly according to claim 15, wherein all switching elements of said active discharge branch and of said passive discharge branch are configured in the form of transistors.

17. Electrical assembly according to claim 16, wherein said intermediate circuit discharge unit comprises at least one control device which is connected to said at least one second control connection of said passive discharge branch for controlling a discharge along said at least one second sub-branch.

18. Electrical assembly according to claim 17, where the discharge via said active discharge branch can be activated or deactivated as required.

* * * * *